United States Patent [19]

Windley

[11] Patent Number: 4,919,874

[45] Date of Patent: Apr. 24, 1990

[54] PROCESS FOR PREPARING A NYLON FIBER WITH REDUCED SPHERULITES

[75] Inventor: William T. Windley, Seaford, Del.

[73] Assignee: E. I. du Pont de Nemours and Company, Wilmington, Del.

[21] Appl. No.: 95,234

[22] Filed: Sep. 11, 1987

Related U.S. Application Data

[62] Division of Ser. No. 860,251, May 6, 1986, Pat. No. 4,729,923.

[51] Int. Cl.$^5$ ............................ D01F 1/00; D01F 6/60
[52] U.S. Cl. ................................ 264/168; 264/210.5; 264/210.6; 264/210.8; 264/211
[58] Field of Search ...................... 264/211, 78, 210.6, 264/DIG. 56, 168, 210.5, 210.8; 106/461, 471; 8/924, 925, DIG. 21

[56] References Cited

U.S. PATENT DOCUMENTS

| | | | |
|---|---|---|---|
| 3,529,929 | 9/1970 | Page et al. | 23/88 |
| 3,867,339 | 2/1975 | Sanroma | 260/45.7 R |
| 4,012,557 | 3/1977 | Cornellis | 264/177.13 |
| 4,092,301 | 5/1978 | Russo et al. | 260/78 L |
| 4,167,614 | 9/1979 | Ciferri et al. | 525/4 |
| 4,176,227 | 11/1979 | Baggett et al. | 528/335 |
| 4,335,223 | 6/1982 | Flood et al. | 525/179 |
| 4,404,325 | 9/1983 | Mason et al. | 525/179 |
| 4,436,872 | 3/1984 | Flood et al. | 525/179 |
| 4,447,574 | 5/1984 | Keske et al. | 524/400 |
| 4,457,883 | 7/1984 | Howse et al. | 264/168 |
| 4,559,196 | 12/1985 | Kobsa et al. | 264/168 |

FOREIGN PATENT DOCUMENTS

| | | |
|---|---|---|
| 2420681 | 12/1974 | Fed. Rep. of Germany . |
| 151318 | 10/1981 | German Democratic Rep. . |
| 1217887 | 12/1970 | United Kingdom . |
| 1465046 | 2/1977 | United Kingdom . |

OTHER PUBLICATIONS

*Polymer Science*, U.S.S.R., vol. 8, No. 12, 1966, pp. 2294-2300, Search Report—European Patent Office, (Translation).

*Primary Examiner*—Hubert C. Lorin

[57] ABSTRACT

A process for preparing a nylon 66/6 copolymer fiber with reduced spherulites comprising adding 1-6% caprolactam and 0.001-2% water-soluble inorganic calcium salt to 94-99% nylon 66 salt to form a nylon 66/6 salt solution, polymerizing the salt solution to form a polymer, and extruding the polymer.

7 Claims, 2 Drawing Sheets

PROCESS FOR PREPARING A NYLON FIBER WITH REDUCED SPHERULITES

This is a division of application Ser. No. 860,251, filed May 6, 1986 now U.S. Pat. No. 4,729,923.

TECHNICAL FIELD

This invention relates generally to a room temperature dyeable polyamide fiber with low spherulites and a process for making polyamide yarn from 1-6% nylon 6, 94-99% nylon 66 and 0.001-2% soluble inorganic metal salt, preferably calcium acetate

BACKGROUND

High luster and clarity are highly desired in polyamide filaments to be used for certain styles of carpets. Clarity (or transparency) depends on the absence of particles or optical discontinuities within the polymer which refract or scatter light Both clarity and high luster require a smooth filament surface lacking surface roughnesses which scatter or deflect incident light.

Furthermore, carpet yarns which can be dyed satisfactorily at room temperature are greatly desired to reduce the energy costs of finishing carpets whether or not the fibers also require high luster or clarity. The three properties may be desired individually or in various combinations in different carpet yarn products.

Room temperature dyeability was achieved in Kobsa and Windley, U.S. Pat. No. 4,559,196 by steam setting deep-dyeable salt blend copolymer of nylon 66 and nylon 6 wherein the nylon 6 constituted 6-12% of the material. However, a portion of the caprolactam vaporizes out of the hot filaments below the spinneret and condenses on the frame of the spinning machine or cold walls of the spinning enclosure causing deposits which can interfere with the filaments or the quench air flow. If the polymer is conditioned as flake, the caprolactam can deposit in the drying system ducts.

Most polyamides develop spherulites, which are regions within the filaments in which the molecular chains pack radially outward from a nucleus to form a spherical structure. Spherulites are undesirable both because they scatter light and because they impede the ordering of crystal structure into preferred alignments during drawing, resulting in brittleness or lower strength of the filaments. Large spherulites are generally more damaging to the physical properties and luster than small ones, so a conventional solution to spherulite problems is to add fine particulate matter of various sorts to act as nucleating agents, producing a large number of small spherulites rather than fewer large ones However, the particulate matter and small spherulites make the polymer cloudy.

SUMMARY OF THE INVENTION

The process of this invention for preparing a nylon 66/6 copolymer fiber comprises the steps of:

(a) adding 1-6% nylon 6 and 0.001-2% soluble inorganic metal salt to 94-99% nylon 66 to form a nylon salt solution;

(b) polymerizing the salt solution to form a polymer; and (c) extruding the polymer into filaments.

The addition of a small amount of a water-soluble inorganic salt of a highly-reactive metal to a salt of nylon 66 having 1-6% nylon 6 salt reduces spherulites to a fully acceptable level, giving high clarity along with increased moisture retention. Furthermore, hot jet crimping the filaments in superheated steam at a temperature in excess of 240° C., preferably in excess of 270° C. and preferably drawing the filaments and heating the filaments in excess of 170° C. before crimping the filaments produces a product which can be dyed satisfactorily at room temperature, the filaments have a smooth surface which contributes high luster along with clarity whereas similar filaments not containing the metal salt have a rough surface The filaments with metal salt also quench more readily after extrusion from the spinneret, requiring less quench air flow, or they may be spun at a faster rate. For room temperature dyeability, the nylon salt should contain excess diamine, giving greater amine ends. By adding calcium acetate, room temperature dyeability can be achieved in a salty blend copolymer of nylon 66 and nylon 6 wherein the nylon 6 is less than 4% and deposits of caprolactam are minimized.

The addition of water-soluble calcium salt, preferably calcium acetate, to nylon 66 polymer in amounts less than about 2% gives filaments having increased moisture retention, physical properties, density, and cold dye rate compared to filaments without calcium salt In conjunction with the salt addition of about 4% nylon 6 to form a nylon 66/6 copolymer, and/or the addition of fluorocarbon blowing agent to the melted polymer, the addition of such calcium salt also can eliminate spherulites, yield a smooth filament surface, and facilitate quenching of the hot filaments after melt spinning.

The addition of soluble inorganic metal salt is believed to contribute to room temperature dyeability by reducing carboxyl ends in the nylon. Fewer carboxyl ends give higher dye rate, one less carboxyl end being roughly equivalent to the addition of two amine ends.

TEST METHODS

Analysis for Calcium

A yarn sample weighing 2.0±0.1 g. is placed in a silica crucible and burned in an AA grade propane flame until no flame from the sample is observed. The crucible is covered with a watch glass and is placed in a muffle furnace maintained at 650° C. for approximately 45 minutes. The crucible is cooled and the ash is washed from the crucible into a 50 ml. volumetric flask with demineralized water, then 5.0 ml of 6N HCl is added to the flask and the sample is diluted to 50 ml with demineralized water.

An atomic absorption spectrophotometer, Perkin-Elmer Model 403, is calibrated first against a sample of demineralized water and HCl then against a standard solution of calcium carbonate which are aspirated into a flame of acetylene and nitrous oxide. The solution obtained from the yarn sample above is then aspirated into the flame and the concentration of calcium is determined.

Spherulite Rating

Figure 1:
FIG. 1 is a photograph of a cross-section of Example 1 taken at a magnification of 270.
Figure 2:
FIG. 2 is a photograph of a cross-section of Example 2 taken at a magnification of 270.
Figure 3:
FIG. 3 is a photograph of a cross-section of a Control A taken at a magnification of 270.
Figure 4:
FIG. 4 is a photograph of a cross-section of a Control B taken at a magnification of 270.
Figure 5A:
FIG. 5A is a photograph of a cross-section of a nylon 66 yarn with a spherulite rating of 1 taken at a magnification of 340.
Figure 5B:
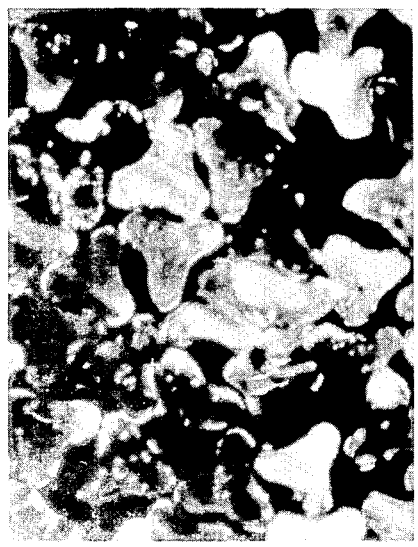
FIG. 5B is a photograph of a cross-section of a nylon 66 yarn with a spherulite rating of 2 taken at a magnification of 340.
Figure 5C:
FIG. 5C is a photograph of a cross-section of a nylon 66 yarn with a spherulite rating of 3 taken at a magnification of 340.
Figure 5D:
FIG. 5D is a photograph of a cross-section of a nylon 66 yarn with a spherulite rating of 4 taken at a magnification of 340.

The severity of spherulites in filaments is measured by reference to a set of controls. Cross-section slices of filaments embedded in resin are examined by transmitted light with an optical microscope under crossed polarizers. Photographs of the cross-sections are taken at a magnification of 340. The appearance of spherulites is similar to Maltese crosses. The controls are set out in FIGS. 5A, 5B, 5C and 5D. FIG. 5A shows filaments covered with less than 20% spherulites and has a spherulite rating of 1. FIG. 5B shows filaments covered with between approximately 20% and 40% spherulites and has a spherulite rating of 2. FIG. 5C shows filaments covered with between 40% and 60% spherulites and has a spherulite rating of 3. FIG. 5D shows filaments covered with more than 60% spherulites and has a spherulite rating of 4.

Cold Dye Rate

A yarn sample is scoured to remove finish, dried in a circulating air oven at 40° C. overnight then in a vacuum oven at 40° C. for two hours The sample is reduced to 25.0 gms. and is conditioned by immersion in a buffer solution of the same pH, temperature and electrolyte content as the dye bath to be used for at least 10 minutes Immediately before dyeing, the sample is removed from the buffer, squeezed to remove excess solution, and then buffer solution is added carefully to the sample so that the total weight of yarn and solution is 100.0 gms. (75.0 gms. of solution).

A dye bath is prepared by dissolving 5 gms. of monosodium phosphate in about 800 ml of water in a 1000 ml volumetric flask, adding 100 ml of a stock solution containing 2.50 gms./liter of "Tectilon" blue 2GA (200%), adjusting the pH to 4.0 and diluting to the mark. The dye is transferred to a 2 liter beaker immersed in a standard incubating bath controlled at 25° C. ±0.1° C. The beaker is provided with a nipple on the side just below the dye level and another on the opposite side near the bottom through which dye is circulated by an external pump at the rate of 1 liter/min. The bath is stirred at 100 cycles per minute by a 6-pronged oscillating stainless steel stirrer.

The concentration of dye in the dye bath is measured with a Brinkman PC-800 colorimeter equipped with a fiber optics probe with an adjustable gap between the light source and the probe The gap is adjusted so that the absorbance reading at the start of a determination is 0.6 to 0.8. A special narrow band pass filter with half width of 10 nm or less manufactured by the Ealing Corp., South Natick, Mass. is inserted into the light beam.

A pH electrode is mounted beside the fiber optics probe and readings are taken at the start and at suitable intervals afterward. A DPT 600 digital thermometer made by Caspar Integrated Systems of Fort Bragg, Calif. which reads in tenths of degrees is also mounted with the probe.

The colorimeter is calibrated to read precisely 1000 mV when the probe is immersed in pure buffer solution. The analog signal is converted to digital twice per second using a SmartFace A/D converter made by Anadata, Inc. of Glen Ellyn, Ill.

To start a reading, the fiber optics probe is inserted into the middle of the beaker and the computer and a stop watch are started simultaneously. After 10+ seconds the probe and stirrer are removed from the dye bath. After precisely 30 seconds, the yarn with buffer solution is immersed quickly in the dye along with the probe and stirrer. The colorimeter signal is recorded twice per second until the dye concentration in the bath drops below 55% of its starting value, due to its absorption into the yarn, at which time the reading is terminated.

A computer is programmed to solve the equation:

$$\frac{C_t}{C_o} = \frac{\log I_c - \log I_t}{\log I_c - \log I_o}$$

where
 $I_c$ = the light intensity measured by the probe in clear water
 $I_o$ = the intensity measured in the dye bath in the first 10 seconds
 $I_t$ = the intensity at time t
 $C_t$ = dye concentration in the bath at time t
 $C_o$ = dye concentration in the bath during first 20 seconds The error function table appearing in Crank, J., "The Mathematics of Diffusion", 2nd ed., Clarendon Press, Oxford, 1975, page 375 is entered in the computer memory.

For each value of $C_t/C_o$, one interpolates in the table of Crank to get a value of root($S_t$). One then plots all the (t, $C_t/c_o$) data points, root(t), abscissa) vs root($S_t$) (ordinate). The slope of the straight line through all these points is $S^{178}$. This slope is squared to obtain the dye rate coefficient, S. Further details and discussion of the method are found in *Textile Research Journal,* October, 1985, pages 573–581.

EXAMPLES

Caprolactam is added in the evaporator to nylon 66 salt having excess diamine to make a nylon 66/6 deep dye salt blend copolymer in which the nylon 6 is 4.0% of the total. In Examples 1 and 2, calcium acetate as a 20% water solution is also added in the evaporator in an amount equal to 0.015% of the total salt. The salt is polymerized, extruded, quenched with water and cut into flake The flake is then melted in a screw melter and is fed through a meter pump to a high-shear spinning filter and spinneret at a temperature of 287° C. and is extruded into 160 trilobal filaments at a polymer throughput of 62.9 pounds per hour (28.6 kg/hr). The spinneret capillary jet velocity is 931.2 cm/min. The filaments are quenched and taken away from the spinneret at a drawdown of 83.2 by a powered feed roll running at a surface speed of 775 meters/minute, is cold drawn 2.71 x, heated by a pair of rolls at 190° C., is crimped in a hot jet, deposited on a rotating screen drum then is tensioned and wound on a package.

The relative viscosity of Control A is 74.4 and Control B is 77.0. The addition of calcium acetate lowers the RV of Example 1 to 54.4 and of Example 2 to 60.5. Control A and Example 1 are crimped with hot air at 290° C. and 110 psig (7.72 kg/cm$^2$), and Control B and Example 2 are crimped with superheated steam at 290° C. and 85 psig (5.97 kg/cm$^2$).

Filaments of the Examples and Control are cross-sectioned and rated for the presence of spherulites. It is found that Controls A and B have an undesirable spherulite rating of 3 while Examples 1 and 2 containing calcium acetate have a fully acceptable rating of 1.

The filaments of Examples 1 and 2 and Control B are analyzed for calcium as described under test methods. Example 1 has 37 parts per million and Example 2 has 34 parts per million. Control B has 2 parts per million, probably from contamination Filaments of Example 2 are cross-sectioned into portions 0.5 microns thick and are examined with a Phillips Model 300 transmission electron microscope at a magnification of 16,500. No particles larger than 0.25 micron were found, confirming that calcium in the form of calcium acetate is substantially dissolved as it is incorporated in the polymer. Particulate materials based on calcium which have been used as nucleating agents or for other purposes have many particles larger than 0.5 micron.

The yarns of the Examples and Controls are cable twisted and heat set in saturated steam at 132° C. while relaxed. It is found that the yarns of Control B and Example 2 which were steam bulked at high steam temperature both have a cold dye rate above $1000 \times 10^{-5}$ reciprocal seconds, indicating that they may be dyed satisfactorily at room temperature. However, only Example 2 has a satisfactory spherulite rating in addition to room temperature dyeability. Furthermore, the yarn of Example 2 has a substantially greater cold dye rate than Control B.

|  | Example No. 1 | Control A | Example No. 2 | Control B |
|---|---|---|---|---|
| Calcium Acetate % | 0.015 | 0 | 0.015 | 0 |
| Cold Dye Rate $\times 10^{-5}$ sec$^{-1}$ Steam Heatset 132° C. | 568 | 682 | 2068 | 1356 |
| Spherulite Rating | 1 | 3 | 1 | 3 |
| Relative Viscosity | 74.4 | 54.4 | 77.7 | 60.5 |
| Amine Ends | 64.5 | 60.7 | 64.5 | 60.7 |

I claim:
1. A process for preparing a nylon 66/6 copolymer fiber with reduced spherulites from a nylon 66/6 salt solution comprising the steps of:
   (a) adding 1–6% caprolactam and 0.001–2% water-soluble inorganic calcium salt to 94–99% nylon 66 salt to form a nylon 66/6 salt solution;
   (b) polymerizing the salt solution to form a polymer; and
   (c) extruding the polymer into filaments.
2. The process of claim 1 further comprising the step of crimping the filaments at a temperature in excess of 240° C.
3. The process of claim 2 further comprising the steps of drawing the filaments and heating the filaments at in excess of 170° C. before crimping the filaments.
4. The process of claim 3 wherein the filaments are crimped at a temperature in excess of 270° C.
5. The process of claim 1 wherein the calcium salt is calcium acetate.
6. The process of claim 2 wherein the calcium salt is calcium acetate.
7. The process of claim 4 wherein the calcium salt is calcium acetate.

* * * * *